United States Patent
Eisbrenner

(10) Patent No.: US 7,793,458 B2
(45) Date of Patent: Sep. 14, 2010

(54) FLYHOOK THREADER AND TYING APPARATUS

(76) Inventor: Ronald J. Eisbrenner, 12931 Drury La., Plymouth, MI (US) 48170

( * ) Notice: Subject to any disclaimer, the term of this patent is extended or adjusted under 35 U.S.C. 154(b) by 149 days.

(21) Appl. No.: 12/055,390

(22) Filed: Mar. 26, 2008

(65) Prior Publication Data

US 2009/0241407 A1     Oct. 1, 2009

(51) Int. Cl.
*A01K 91/04* (2006.01)
(52) U.S. Cl. .......................... 43/44.83; 43/4
(58) Field of Classification Search ........... 43/44.83, 43/4, 43.16, 25.2; 223/99; 112/224, 225
See application file for complete search history.

(56) References Cited

U.S. PATENT DOCUMENTS

| | | | |
|---|---|---|---|
| 232,185 A * | 9/1880 | Jaccard ................. 223/99 |
| 886,375 A | 5/1908 | Koon |
| 1,090,916 A * | 3/1914 | Hertel ................... 223/99 |
| 2,682,126 A * | 6/1954 | Shepherd .......... 269/254 CS |
| 2,934,369 A | 5/1958 | Kennedy |
| 3,180,665 A | 4/1965 | Barlett |
| 3,252,724 A | 5/1966 | Kearns |
| 3,265,422 A | 8/1966 | Pierce |
| 3,357,086 A | 12/1967 | Hood |
| 3,402,957 A | 9/1968 | Peterson |
| 3,521,918 A | 7/1970 | Hammond |
| 3,575,449 A | 4/1971 | Browning |
| 3,625,556 A | 12/1971 | Stromberg |
| 3,965,605 A | 6/1976 | Allen |
| 4,101,152 A | 7/1978 | Gardipee |
| 4,188,052 A | 2/1980 | Browning |
| 4,333,614 A | 6/1982 | Flax |
| 4,403,797 A | 9/1983 | Ragland, Jr. |
| 4,462,551 A | 7/1984 | Bloch |
| 4,573,719 A | 3/1986 | Aldridge |
| 4,660,314 A | 4/1987 | Janssen et al. |
| 4,765,082 A | 8/1988 | Nicholas |
| 4,841,667 A | 6/1989 | Johns |
| 4,864,762 A | 9/1989 | Cox |
| 4,930,249 A * | 6/1990 | Johns ................. 43/43.16 |
| 5,230,177 A | 7/1993 | Hanley |
| 5,353,545 A | 10/1994 | Masetti |
| 5,685,037 A | 11/1997 | Fitzner et al. |
| 5,951,067 A | 9/1999 | High |
| 6,041,541 A * | 3/2000 | Davis ................. 43/44.83 |
| 6,393,758 B1 | 5/2002 | Sparkman |
| 6,625,921 B2 | 9/2003 | Friederichs, III |
| 6,715,804 B2 | 4/2004 | Beers |
| 7,036,265 B2 | 5/2006 | Moffitt |
| 2006/0236587 A1* | 10/2006 | Rankine ............... 43/25.2 |
| 2006/0283072 A1* | 12/2006 | Mitchell et al. ........... 43/4 |

* cited by examiner

*Primary Examiner*—Christopher P Ellis
(74) *Attorney, Agent, or Firm*—VanOphem & VanOphem, PC

(57) ABSTRACT

The invention is a fishhook threading device mounted on the rod of a fishing pole and utilizing opposing diverging funnel-shaped passages in the main body of the device. One passage is for mounting the eyelet of a fishhook therein while a line is threaded through the opposing passage to be guided into the eyelet of the fishhook. After the fish line is threaded through the eyelet, the end thereof can be grasped by the fingers of the fisherman to remove the hook and line from the threading device and allow any desired knot to be tied to permanently attach the fishhook to the fish line.

7 Claims, 2 Drawing Sheets

FLYHOOK THREADER AND TYING APPARATUS

CROSS-REFERENCE TO RELATED APPLICATIONS

Not applicable.

FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention relates to new and useful improvement of a fishing tool and more specifically, to a tool used to thread a line through an eyelet and more specifically, threading a fishing line through an eyelet of a fishhook.

2. Description of the Prior Art

The sport of fishing can be enjoyed by many people, both young and old, and can be both relaxing as well as exciting. One of the first tasks to master is the simple task of tying a hook to a line which in the normal home environment may be considered an extremely simple task to master. However, when such a task is to be accomplished at the fishing site, it can be extremely demanding due to the conditions of the environment when such a task needs to be completed. For example, a small eyelet of a hook may be difficult to find by a fisherman when the daylight is insufficient and the line is slippery and wet thereby making the threading a difficult task. Further, if the act is accomplished while in a boat on water, the constant movement presents a difficult problem and requires close handling by the fisherman in order to properly thread a small eyelet hook to the line. This is especially difficult with monofilament line which is difficult to see when the light conditions are poor and good eye/hand coordination is required in order to accomplish this feat. Generally, both hands are required to complete this task and therefore if the fisherman is in a boat, it is simple to lay the fishing pole on the bottom of the boat and finalize inserting the fishing line through the eyelet of the fishing hook.

However, for a fly-fisherman, this procedure may not be available since most fly-fishermen prefer to stand in the stream and cast their line accordingly. Also, the frequent changes of flies for a fly-fisherman makes the simple task of attaching a new fly to a leader line quite challenging considering the environmental conditions that may exist at the fishing site.

To assist a fisherman in accomplishing this simple feat, many prior art devices have been proposed. For example, U.S. Pat. No. 2,682,126 discloses a holder for threading fishhooks in the form of two complimentary blocks. These blocks are made of transparent plastic or similar material so that there is clear visibility through them. Both blocks are drilled transversely at a substantial central point to receive a bolt. The bolt carries a hexagonal nut in the block. A counterbore in one of the two blocks holds a helical spring under the head of the bolt. The meeting edges of the blocks are cut back as shown in FIGS. 1 and 2 to provide a groove. From a central point in the groove, two passageways are formed by recesses cut in the crossing faces of the blocks and extend in diagonal directions downwardly toward the end faces of the blocks.

The lower end of one passageway is flared outwardly to form a funnel-shaped opening to facilitate the entrance of a leader. The opposite passageway is flared outwardly at the bottom for a similar purpose. A cavity or compartment is formed by aligned recesses in the opposing faces of the blocks from the top groove downwardly to intersect the passageway. This cavity crosses the passageway to form an extension. A similar cavity is formed in the opposing block to intersect the second passageway beyond which it extends as is shown. The leader maybe passed into one of the flaring entrances and through one of the passageways. There the leader passes through the eye of the fishhook which is centered in the passageway due to the extent of the cavities. The end of the leader is brought out through a groove and after the blocks have been spread apart, the end of the leader maybe knotted in the usual way. The fishhooks are fitted into the cavities. Thus, the barbs are held in the groove and the eye is centered across the passageway. This permits the fisherman to use both hands for holding the device and directing the leader upwardly through the passageway. The shortcomings of this device are the fact that both hands must be used in order to thread the wire through the fishhook. Also, since the cavities are designed to fit specific size hooks, different size devices must be used in order to accommodate the large range of hook sizes that are available today.

Similarly, U.S. Pat. No. 5,638,633 attempts to solve this dilemma by introducing a threader that is inserted into the eye of a hook to funnel the amount of the filament line through the hook. While solving the problem of threading the hook, the invention creates another problem by leaving the threader attached to the hook. The funnel shape can actually increase resistance of the hook to move freely through the water. Further, it encumbers the line in such a way that a fisherman may not desire.

A further prior art solution to solve the threading problem of fisherman is introduced by U.S. Pat. No. 5,806,235 in which a device which stores, ties, and dispenses fishhooks is proposed. This invention however, can only accommodate certain size fishhooks, namely, ones that fit within its housing. Fishhooks that are larger than the housing cannot be used at all with this invention.

Finally, U.S. Pat. No. 6,041,541 discloses a fishing line threader which has a tapered interior wall, to guide the fishing line to the hook opening. The hook eye is disposed at the bottom of the tapered wall. The device is attachable to the eye and crushable to remove it from the eye. The crushable feature makes storage of the device in a tackle box difficult. This device has problems in that it requires matching the bottom of the tapered wall up with the eye. An angler capable of such alignment may just as well orient the line up with the eye. The hard device does not form around the eye, leaving gaps where the line may be misdirected. Other inconveniences are also present with this device.

It is readily obvious that what is needed is a line threader suitable for using in harsh environments (i.e. darkness, rain, cold temperatures, etc.) which need not be held in the hands of an angler and can be conveniently used without the need of good eye/hand coordination in a boat or while standing in the water and adapted to contain different size hooks. It further has the ability to easily and consistently move each individual hook into the same predetermined position to allow for the easy guiding of a line through the fishhook eye while the fishhook is contained within the device.

SUMMARY OF THE INVENTION

The present invention is a fishhook threading device that is mounted on the body of a fishing pole. The device will snap onto a fishing pole so that a fisherman will have both hands free to quickly and easily thread a fishing line into the eyelet of a fishing hook.

The threading device has a longitudinal body portion that is integrally formed and therefore attached to an annular resilient body portion defining a mount for attachment to a fishing pole. The longitudinal body portion has a central passage extending from one end of the longitudinal body portion to an opposite end of the longitudinal body portion. The central passage has a predetermined opening between the one end and the opposite end with diverging internal wall portions on either side of the predetermined opening. The longitudinal body portion further has an outer surface defining a cut-away segment, the cut bottom surface of the cut-away segment intersecting one of the diverging internal wall portions so as to define a slit axially aligned with the central passage.

The present invention is also a method of threading a fishhook eyelet including the steps of mounting the eyelet of a fishhook in a first diverging internal wall portion of a first passage in a longitudinal body portion. Thereafter inserting (feeding) a fishing line into an opposing second diverging internal wall portion passage axially aligned with the first diverging passage until the fishing line threads through the eyelet of the fishing hook. The fishing line with the fishhook mounted thereon is removed from the longitudinal body through a co-axially aligned slit in the longitudinal body portion so that a knot can be made thereby tying the line to the hook using any one of the available known knot tying methods.

The primary object of this invention is to disclose a device which is removably mounted to a fishing pole to allow use of both hands by the user to thread a fishing line through an eyelet of a fishhook and remove the hook and line from the device to thereafter knot the line and secure the hook to the fish line.

A further object of the invention is to disclose a device which can be used to thread a fishing line into the eyelet of a fishing hook which will accommodate any size fishing hook as well as any size fishing line to thread the fishing line through the eyelet of the fishhook.

A further object of the invention is to disclose a device which is adapted for threading the eyelet of a fishhook which has the ability to easily and consistently place each individual fishhook, regardless of its size, into the same, predetermined position to allow for easy and safe guidance of a fishing line through the eyelet of the hook while the hook is mounted in the device.

It is still a further object of the invention to disclose a device to make the difficult task of threading an eyelet of a fishhook easy and save valuable time for the fisherman regardless of the environmental condition.

It is still a further object of the invention to disclose a threading device which is easy to use, economical to purchase, and adapted to be used with any size fishhook or fishing line size.

These and other objects of the present invention will become obvious from the following description.

DETAILED DESCRIPTION OF THE PREFERRED EMBODIMENT

Figure 1:
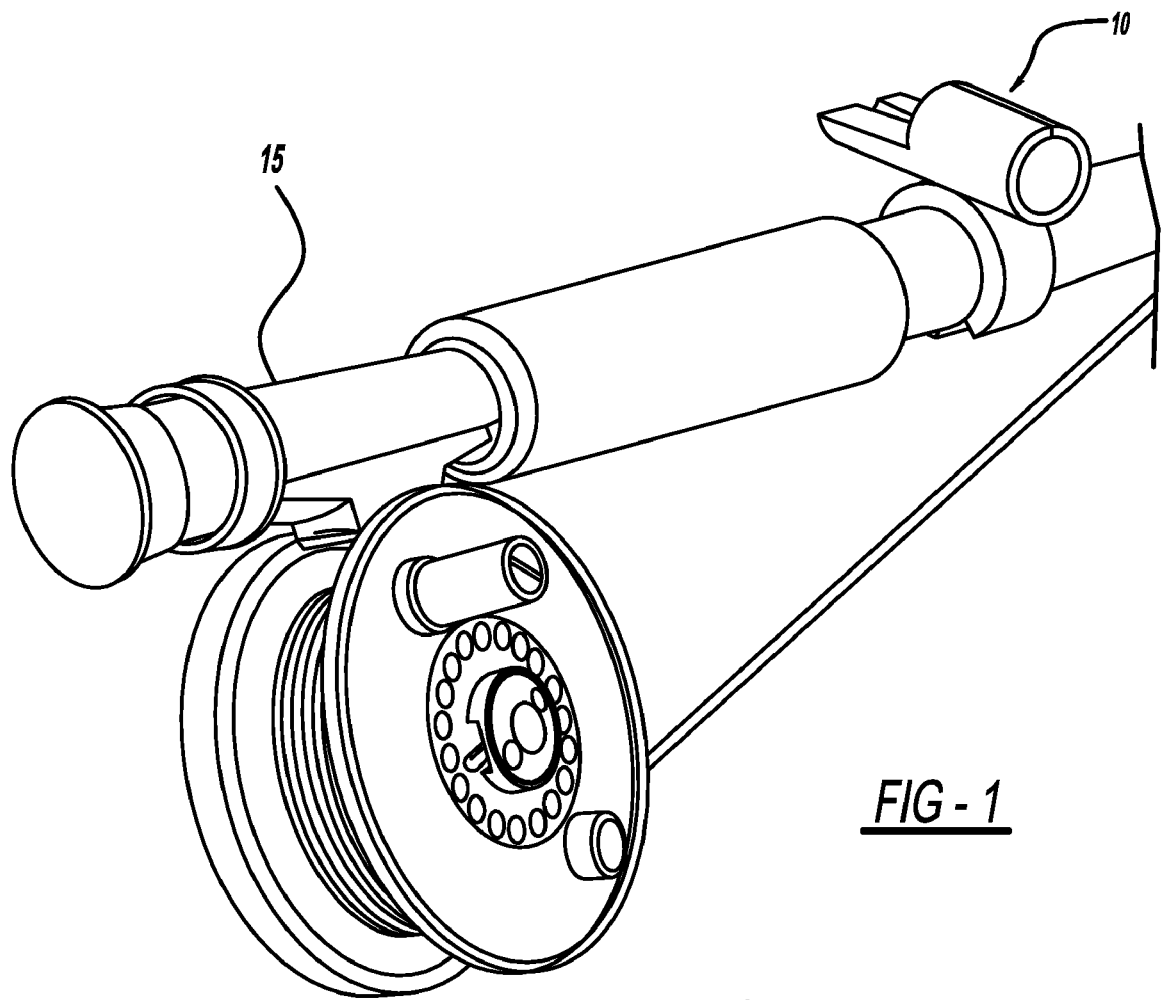
FIG. 1 is a perspective view of the invention illustrating the device mounted on a fishing pole.
Figure 2:
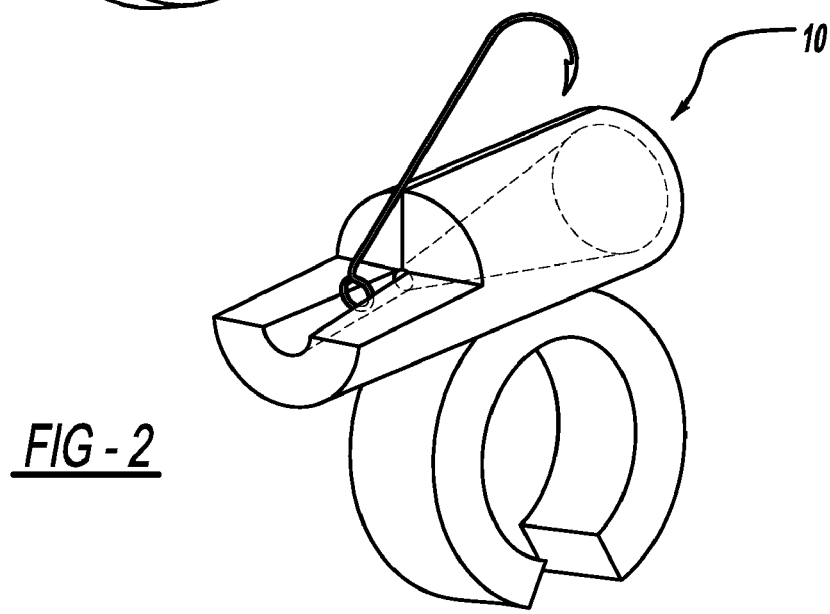
FIG. 2 is an isometric view of the fishhook threading device.

With reference to FIGS. 1-7, the present invention is a fishhook threading device 10 mounted on a fishing pole or rod 15 so as to provide a fixed mount for the fishhook threading device 10 and allow complete freedom for both hands of a fisherman by holding the fishing rod 15 under the arm of the fisherman. The mount is resilient and consists of a body mount portion 20 having two resilient arm extensions 22 which are spread apart to frictionally clamp to the outside periphery of the fishing pole 15. Although the preferred embodiment is illustrated as two resilient annular arm extensions with a central hole 24 and an arc segment portion 26 of the annular arm extension being removed so as to define two resilient arm extensions 22 which are intended to be pressed onto the fishing rod 15 to frictionally grasp the fishing rod 15 for removably mounting thereon, and allow the fisherman complete freedom with both hands in order to thread the line to the eyelet of a fishhook, other frictional mounts are contemplated. For example, a pair of tapered or flared resilient flanges extending from the main body portion and the distance between the tapered body portion or flared extending resilient flanges are somewhat smaller than the diameter of the fishing rod 15.

The main body portion 30 is attached to the body mount portion 20 so that its longitudinal extent is transverse to the central axis of the fishing pole 15 when the fishhook threading device 10 is frictionally mounted to the fishing pole 15. It is preferred that the fishhook threading device 10 is of unitary construction. However, multiple piece construction is contemplated as long as the body mount portion 20 securely holds the fishhook threading device 10 to the fishing pole 15 and the main body portion 30 is oriented substantially transverse to the axis of the fishing pole 15 for the reasons that will become obvious hereinafter.

The main body portion 30 has a central passage 32 extending from one end face 34 to an opposite end face 36. The central passage 32 has a defined opening 38 between the one end face 34 and the opposite end face 36. The opening 38 will prescribe the maximum diameter of fishing line that may be used in attempting to thread a line through the eyelet of a fishhook. Because of the wide variations of eyelet size of fishhooks, starting as small as 0.015 mm diameter, as well as the diameter size of the associated fishing line, it is contemplated that the invention will best serve its purpose when smaller size eyelets are to be used. However, there is no reason why the inventive device could not be used to thread the larger diameter eyelets of larger fishhooks. Therefore, it is foreseen that the defined opening 38 of the central passage 32 is sized to accommodate a range of fish line sizes and associated fishhook sizes such that in order to accommodate all sizes of fish line, more than a single threading device may be used. However, the objective is to accommodate all smaller size eyelets of the vast range of fishhooks in one threading device.

Figure 7:
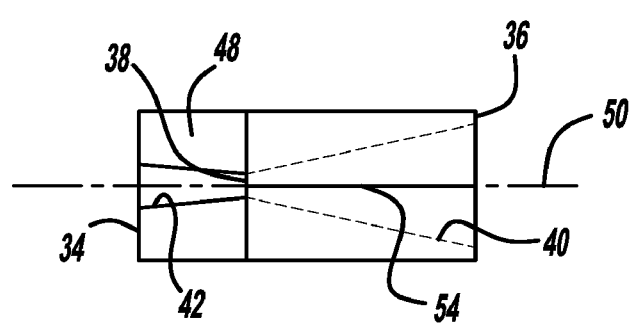
FIG. 7 is a top view of the fishhook threading device as shown in FIG. 3.

The central passage 32 further has diverging internal wall portions or funnel-shaped passages 40, 42 on either side of the defined opening 38 for a purpose to be described hereinafter. The main body portion 30 of the fishhook threading device 10 further has a cutaway segment 44 which is intended to intersect the diverging internal wall 42 of the central passage 32, so as to create a diverging slit 46 in the cutaway top surface 48 of the cutaway segment 44, as shown in FIG. 7. The cutaway top surface 48 is well above the central axis 50 of the central passage 32 so that the diverging internal wall portion 42, when viewed from an end view as in FIG. 5, has an arc segment circumferential extent 52 well in excess of 180°, preferably 270° to 315°.

Since the diverging slit 46 is an opening to receive the eye of the fishhook to be threaded, the amount of contact area that the diverging internal wall portion 42 of the main body portion 30 needed to frictionally hold the eyelet in place while being threaded will be a function of the size of the eyelet to be frictionally held therein. Therefore, it is conceivable, as earlier stated, that the fishhook threading device 10 may be made into two sizes, that is, one size to thread medium to small size fishhooks and a second size to thread medium to large size fishhooks.

Figure 5:
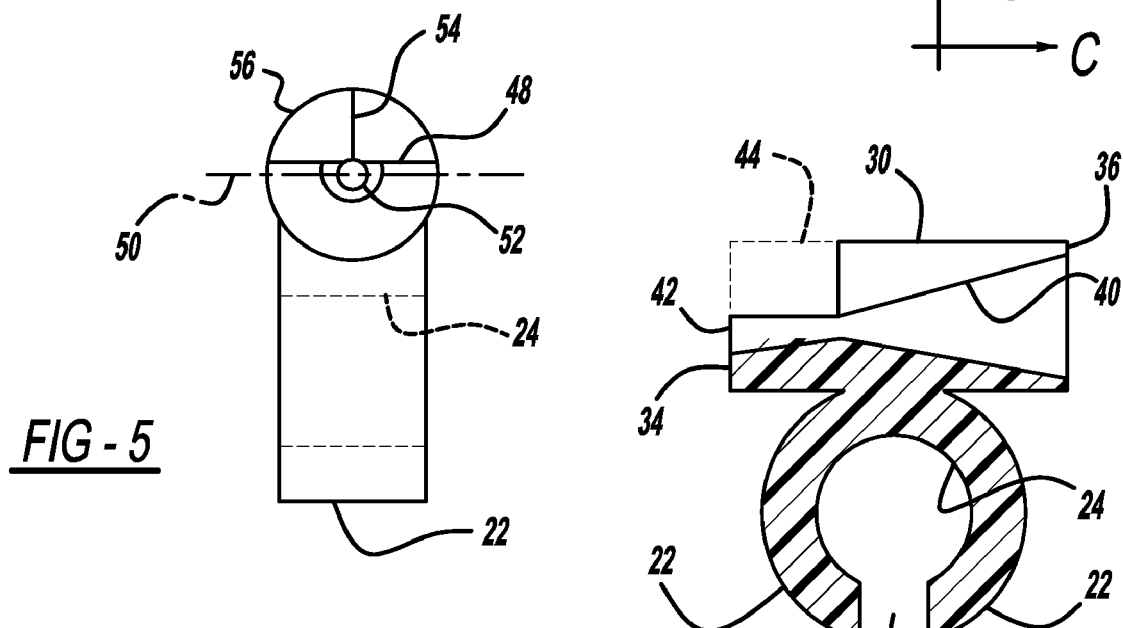
FIG. 5 is a side view of the fishhook threading device as viewed in the direction of Arrow B of FIG. 3.
Figure 6:
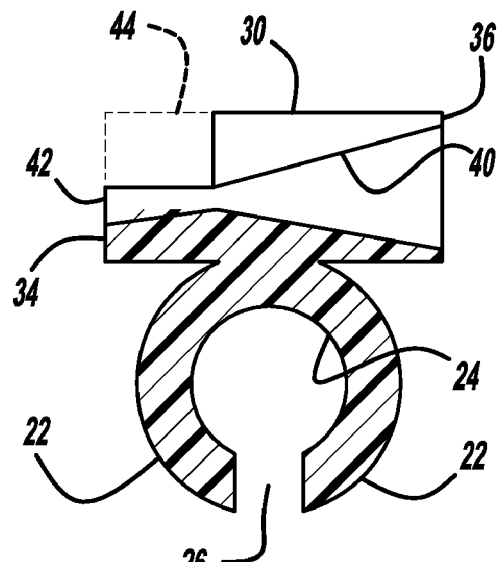
FIG. 6 is a cross-sectional view of FIG. 4 of the fishhook threading device as viewed along Arrows C-C.

The main body portion 30 further has a slit 54 which extends between the cutaway segment 44 and the opposite end face 36. The slit 54 extends radially through the main body portion 30 from the central passage 32 to the outer periphery 56 of the main body portion 30 as illustrated in FIGS. 5 and 7. The fishhook, when properly mounted in the threading device, projects outwardly and is held securely in place by the frictional engagement of the outer circumferential surface surrounding the eyelet with the diverging internal wall portion 42 (shown in FIG. 3) of the central passage 32. With the fishhook firmly mounted in this position, it is a simple matter for the fisherman to insert an end portion of a line or leader into the opposing diverging internal wall portion or funnel-shaped passage 40 and to simply thread the line through the eyelet of the fishhook, since the funnel-shaped passage 40 guides the line along the central passage 32 through the eye of the fishhook.

Figure 3:
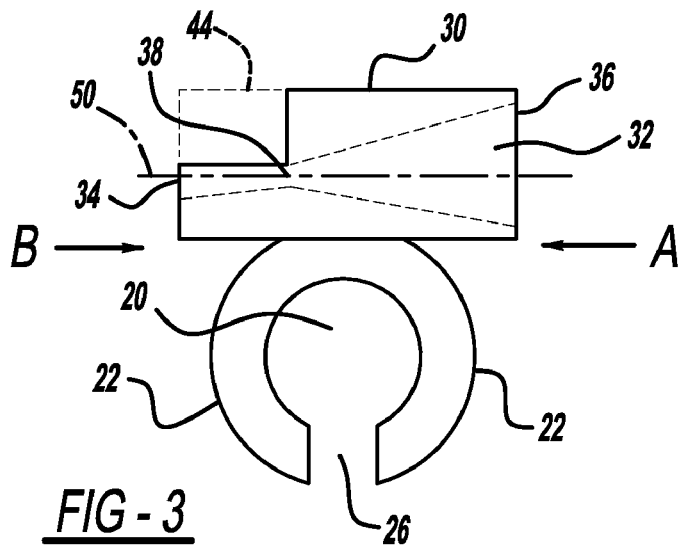
FIG. 3 is a side plan view of the fishhook threading device.
Figure 4:
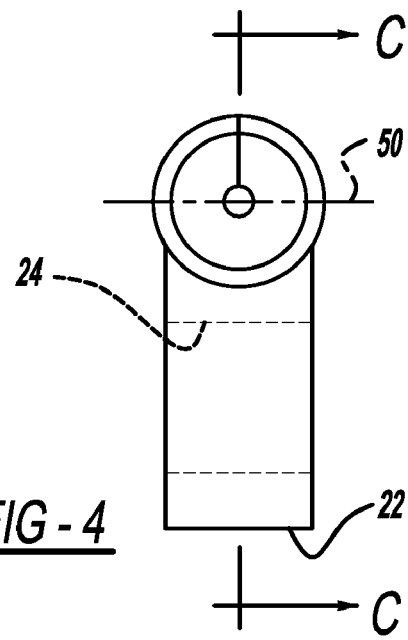
FIG. 4 is a side view of the fishhook threading device as viewed in the direction of Arrow A of FIG. 3.

In practice, to thread a fishhook to a fish line or leader line, the fishhook threading device 10 is frictionally mounted on a fishing pole 15 as shown in FIG. 1. A new fishhook is mounted to the fishhook threading device 10 by forcing the eyelet of the fishhook into the diverging slit 46 and frictionally engaging the diverging internal wall portion 42. The eyelet enters the funnel-shaped passage 42 and is pushed in the direction from the end face 36 towards the opposite end face 34 until the eyelet of the fishhook frictionally engages the diverging internal wall portion 42 and is frictionally held thereby as shown in FIG. 3.

It is proposed that while the hook is threaded that the fishing pole 15 be held between the body and arm of the fisherman so that both hands are free to accomplish the task. As shown in FIG. 3, the eyelet of the fishhook to be threaded is mounted in the funnel-shaped passage 42 and frictionally held in place with the eyelet mounted transverse to the central passage 32 of the main body portion 30. The eyelet of the fishhook is then concentrically frictionally mounted into the diverging internal wall portion 42 while the shank of the hook projects outwardly from the cutaway top surface 48 of the cutaway segment 44. A fish line or leader line is then pushed into the diverging internal wall portion or funnel-shaped passage 40 and guided thereby until the line reaches the eyelet of the fishhook. Since it is circumferentially frictionally mounted in the internal diverging wall portion 42, the line will be guided through the eyelet of the fishhook and along the funnel-shaped passage 42 where it can be grabbed by the fingers to lift the threaded fishhook out of the diverging internal wall portion 42 and remove the line through the slit 54 so as to enable the fisherman to tie any desired knot into the line to retain the fishhook thereon.

While the present invention has been described in terms of a preferred embodiment, it is apparent that other forms could be adopted by one skilled in the art. In other words, the teachings of the present invention encompass any reasonable substitutions or equivalents of claim limitations.

What is claimed is:

1. A fishhook threading and tying apparatus adapted to mount on a fishing pole, said threading and tying apparatus comprising:
   a resilient body portion having a longitudinal internal passage having a central axis, said longitudinal internal passage spanning from one end face to an opposite end face of said resilient body portion, said longitudinal internal passage defining opposing frustoconical wall portions having an internal diameter diverging in a first direction toward said one end face, said internal diameter further diverging in a second opposite direction towards said opposite end face of said longitudinal internal passage;
   a cutaway segment portion adjacent one of said one end face and said opposite end face, said cutaway segment portion having a top surface spaced radially outward of said central axis of said longitudinal internal passage whereby a portion of one of said first direction and second direction internal diameters diverging wall portion is cutaway to define a diverging slit in said resilient body portion such that the eyelet of a fishhook can be frictionally mounted in said diverging slit of said resilient body portion transverse to said central axis of said longitudinal internal passage;
   a slit extending from said longitudinal internal passage through the outer periphery of said resilient body portion said slit being longitudinally aligned said central axis of said longitudinal internal passage; and
   means for mounting said resilient body portion to the pole portion of said fishing pole.

2. The fishhook threading and tying apparatus as claimed in claim 1, wherein said means for mounting further comprises at least one arm member attached to said resilient body portion and extending in a direction away from said resilient body portion; and
   means for frictionally mounting said at least one arm member to said pole portion of said fishing pole such that said resilient body portion is oriented transverse to the axis of said fishing pole.

3. The fishhook threading and tying device as claimed in claim 2 further comprising a cutaway segment portion adjacent one of said one end face and said opposite end face, said cutaway segment portion having a top surface spaced radially outward of said central axis of said longitudinal internal passage whereby a portion of one of said first and second internal diverging wall portion is cutaway to define a diverging slit in said resilient body portion such that the eyelet of a fishhook can be frictionally mounted in said diverging slit of said resilient body portion transverse to said central axis of said longitudinal internal passage.

4. A fishhook threading and tying apparatus adapted to mount on a fishing pole, said threading and tying apparatus comprising:
- a resilient longitudinal body having:
  - an outer surface;
  - one end face;
  - an opposite end face;
  - a through passage extending from said one end face to said opposite end face, said through passage defining a central axis and an internal surface;
  - a slit extending from said internal surface to said outer surface, said slit further being longitudinally aligned with said through passage;
  - said internal surface of said through passage defining a first diverging wall portion in a direction from said one end face toward said opposite end face;
  - said internal surface of said through passage further defining a second diverging wall portion in a direction from said opposite end face toward said one end face, said first and second diverging wall portions further being axially aligned to define an opening at the intersection of said first and second diverging wall portions;
  - a cutaway segment portion at said one end face of said resilient longitudinal body, said cutaway segment portion having a top surface in spaced relation to said central axis of said through passage such that a portion of one of said first and second diverging internal wall portions is cutaway to define a diverging slit in said resilient longitudinal body; and
  - means for frictionally mounting said resilient longitudinal body to said fishing pole whereby when the fisherman is required to thread a fish line to a hook, said fishing pole can be held between the underarm and body of said fisherman such that said fisherman has two free hands to accomplish the threading and tying of said hook utilizing the inventive apparatus.

5. A method of threading and tying a fishhook to a fishing line, said method comprising the steps of:
- placing the eye of a fishhook into a diverging slit of a resilient body portion having a longitudinal internal passage, said longitudinal internal passage having a central axis and spanning from one end face to an opposite end face of said resilient body portion, said longitudinal internal passage defining opposing frustoconical wall portions having a first internal diameter diverging toward said one end face and a second internal diameter diverging towards said opposite end face of said longitudinal internal passage, said resilient body portion further comprising a cutaway segment portion having a top surface spaced radially outward of said central axis of said internal passage whereby a portion of one of said first and second internal diameter diverging wall portions is cutaway to define said diverging slit in said resilient body portion, said eye of said fishhook being placed with the opening oriented transverse to said central axis of said longitudinal internal passage;
- engaging the pole portion of a fishing pole with said at least one arm member attached and extending from said resilient body portion to frictionally mount said resilient body portion transverse to the axis of said fishing pole;
- directing said fishing line into said longitudinal internal passage and along the other of said first and second internal diameter diverging wall portions opposite from said cutaway segment portion and continue directing said fishing line through said eyelet and along said longitudinal internal passage until it exits from said longitudinal internal passage of said resilient body portion; and
- removing said fishhook and said fishing line through said slit in said resilient body portion.

6. The method as claimed in claim 5 wherein said placing step further comprises embedding said eyelet of said fishhook into said diverging slit whereby said fishhook is held in place by said resilient body portion with said eyelet of said fishhook transverse to said longitudinal internal passage.

7. The method as claimed in claim 5 further comprising the step of tying said fishhook on said fishing line using any type of convenient knot.

* * * * *